United States Patent [19]

Ross

[11] Patent Number: 5,577,749
[45] Date of Patent: Nov. 26, 1996

[54] TWIN GEAR DRIVE ASSEMBLY FOR A BICYCLE

[76] Inventor: Thomas Ross, 6657 S. Drexel, Chicago, Ill. 60637

[21] Appl. No.: 273,192

[22] Filed: Jul. 11, 1994

[51] Int. Cl.$^6$ ................................................. B62M 1/02
[52] U.S. Cl. ............................................. 280/261; 280/238
[58] Field of Search .................................... 280/259, 261, 280/260, 238, 236; 474/152, 156, 157, 158, 164

[56] References Cited

U.S. PATENT DOCUMENTS

| D. 270,048 | 8/1983 | Bytheway | D12/11 |
|---|---|---|---|
| 559,299 | 4/1896 | Matthern | 280/261 |
| 789,580 | 5/1905 | Trainor | 280/261 |
| 846,033 | 3/1907 | Kidney | 280/261 |
| 1,154,292 | 9/1915 | Cribbs | 280/261 |
| 4,576,587 | 3/1986 | Nagano | 474/152 |
| 4,586,914 | 5/1986 | Nagano | 474/160 |
| 5,085,620 | 2/1992 | Nagano | 474/152 |
| 5,133,695 | 7/1992 | Kobayashi | 474/160 |
| 5,158,314 | 10/1992 | Farras Pinos | 280/261 X |

FOREIGN PATENT DOCUMENTS

| 0867094 | 9/1940 | France | 280/238 |
|---|---|---|---|
| 1338659 | 11/1973 | United Kingdom | 280/238 |

Primary Examiner—Eric D. Culbreth
Assistant Examiner—F. Zeender

[57] ABSTRACT

A twin gear drive assembly for a bicycle comprising a front gear assembly with a plurality of gears for driving the rear gear; for driving the frontal wheel with an associated front derailleur; an intermediate gear with a shaft coupled to the front gear for concurrent rotation; a drive gear or the frame beneath the front gear assembly with pedals for the rotation thereof with a chain retainer for the drive gear; a lower gear with a larger number of teeth located beneath the drive gear of the second assembly with an associated chain coupling the upper and lower gears of the supplemental gear assembly and pebbles secured to the lower gear of the second assembly for rotating the lower gear directly, the upper gear through the second chain and the first driven gear through the axle therebetween; first control means for controlling the derailleur of the first gear assembly and a second control assembly for controlling the chain in its position with regard to the gears of the second assembly at the discretion of the operator.

1 Claim, 4 Drawing Sheets

TWIN GEAR DRIVE ASSEMBLY FOR A BICYCLE

BACKGROUND OF THE INVENTION

1. Field of the Invention

The present invention relates to twin gear drive assembly for a bicycle and more particularly pertains to employing a second chain and gear assembly to a multi-speed bicycle for increased speed with less stress and strain on a user, particularly during up hill riding.

2. Description of the Prior Art

The use of bicycles with gear shifting capabilities from a wide variety of mechanisms, devices, designs and constructions is known in the prior art. More specifically, bicycles with gear shifting capabilities of a wide variety of methods and apparatuses heretofore devised and utilized for the purpose of shifting gears on a bicycle as a function of the terrain are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. DES. 270,048 to Bytheway discloses a bicycle rear cluster with built-in spacer.

U.S. Pat. No. 4,576,587 to Nagano discloses a front chain gear for a bicycle.

U.S. Pat. No. 4,586,914 to Nagano discloses a multistage front chain gear for a bicycle.

U.S. Pat. No. 5,085,620 to Nagano discloses a multi-gear cluster for bicycle.

U.S. Pat. No. 5,133,695 to Kobayashi discloses a bicycle multiple chainwheel.

In this respect, the twin gear drive assembly for a bicycle according to the present invention substantially departs from the conventional concepts and designs of the prior art, and in so doing provides an apparatus primarily developed for the purpose of employing a second chain and gear assembly to a multi-speed bicycle.

Therefore, it can be appreciated that there exists a continuing need for new and improved twin gear drive assembly for a bicycle which can be used for employing a second chain and gear assembly to a multi-speed bicycle. In this regard, the present invention substantially fulfills this need.

SUMMARY OF THE INVENTION

In view of the foregoing disadvantages inherent in the known types of bicycles with gear shifting capabilities of a wide variety of mechanisms, devices, designs and constructions now present in the prior art, the present invention provides an improved twin gear drive assembly for a bicycle. As such, the general purpose of the present invention, which will be described subsequently in greater detail, is to provide a new and improved twin gear drive assembly for a bicycle apparatus and method which has all the advantages of the prior art and none of the disadvantages.

To attain this, the present invention essentially comprises a new and improved twin gear drive assembly for a bicycle comprising, in combination a bicycle having a frame, front and rear wheels, 16, seat, handle bars, and controls, a rear gear assembly with a plurality of gears on the frame for driving the rear wheel with an associated rear derailleur for shifting and retaining the chain on the proper gear; a front gear assembly with a plurality of gears for driving the rear gear; on the frame for driving the frontal wheel with an associated front derailleur; a first chain coupling the front and rear gears with a chain retainer coupled therewith; an intermediate gear with a shaft coupled to the front gear for concurrent rotation; a drive gear or the frame beneath the front gear assembly with pedals for the rotation thereof with a chain retainer for the drive gear; a second chain coupling the drive gear and the intermediate gearing; a first gear shifter on the handle bars adapted to control the front derailleur; and a second gear shifter on the handle bars for controlling the derailleur.

A lower gear with a larger number of teeth located beneath the drive gear of the second assembly with an associated chain coupling the upper and lower gears of the supplemental gear assembly and pedals secured to the lower gear of the second assembly for rotating the lower gear directly, the upper gear through the second chain and the first driven gear through the axle therebetween; first control means for controlling the derailleur of the first gear assembly and a second control assembly for controlling the chain in its position with regard to the gears of the second assembly at the discretion of the operator.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved twin gear drive assembly for a bicycle which has all the advantages of the prior art bicycles with gear shifting capabilities and none of the disadvantages.

It is another object of the present invention to provide a new and improved twin gear drive assembly for a bicycle which may be easily and efficiently manufactured and marketed.

It is a further object of the present invention to provide a new and improved twin gear drive assembly for a bicycle which is of a durable and reliable construction.

An even further object of the present invention is to provide a new and improved twin gear drive assembly for a bicycle which is susceptible of a low cost of manufacture with regard to both materials and labor, and which accordingly is then susceptible of low prices of sale to the consuming public, thereby making such bicycles economically available to the buying public.

Still yet another object of the present invention is to provide a new and improved twin gear drive assembly for a bicycle which provides in the apparatuses and methods of the prior art some of the advantages thereof, while simultaneously overcoming some of the disadvantages normally associated therewith.

Still another object of the present invention is to employ a second chain and gear assembly to a multi-speed bicycle for increasing the speed with reduced stress and strain on a user.

Lastly, it is an object of the present invention to provide new and improved twin gear drive assembly for a bicycle comprising a front gear assembly with a plurality of gears for driving the rear gear; for driving the frontal wheel with an associated front derailleur; an intermediate gear with a shaft coupled to the front gear for concurrent rotation; a drive gear on the frame beneath the front gear assembly with pedals for the rotation thereof with a chain retainer for the drive gear; a lower gear with a larger number of teeth located beneath the drive gear of the second assembly with an associated chain coupling the upper and lower gears of the supplemental gear assembly and pebbles secured to the lower gear of the second assembly for rotating the lower gear directly, the upper gear through the second chain and the first driven gear through the axle therebetween; first control means for controlling the derailleur of the first gear assembly and a second control assembly for controlling the chain in its position with regard to the gears of the second assembly at the discretion of the operator.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numeral refers to the same part throughout the various figures.

DESCRIPTION OF THE PREFERRED EMBODIMENT

Figure 1:
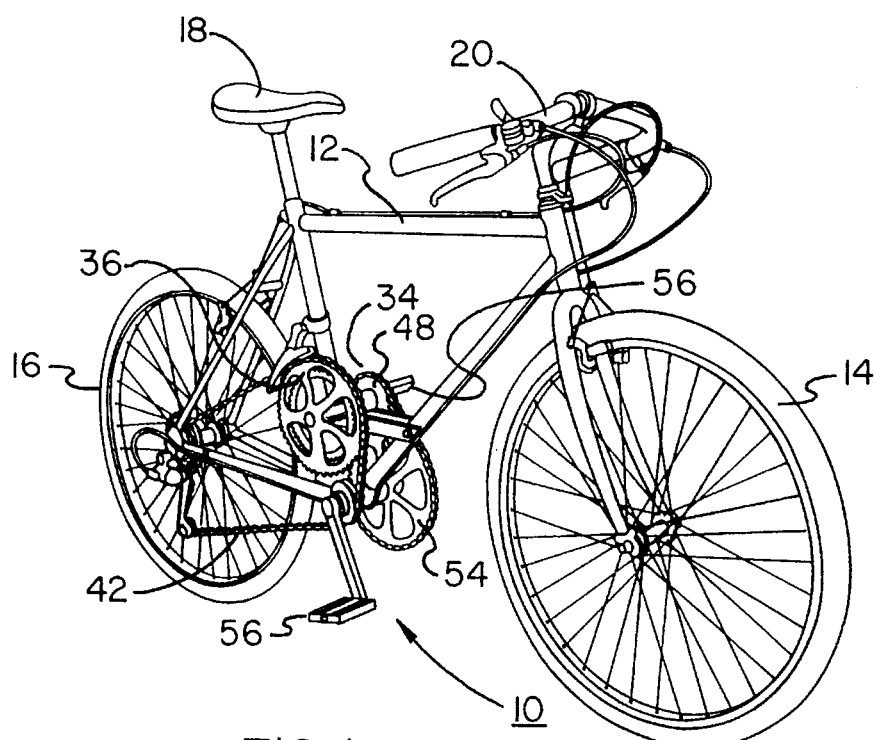
FIG. 1 is a perspective view of the preferred embodiment of the new and improved twin gear drive assembly for a bicycle constructed in accordance with the principles of the present invention.
Figure 2:
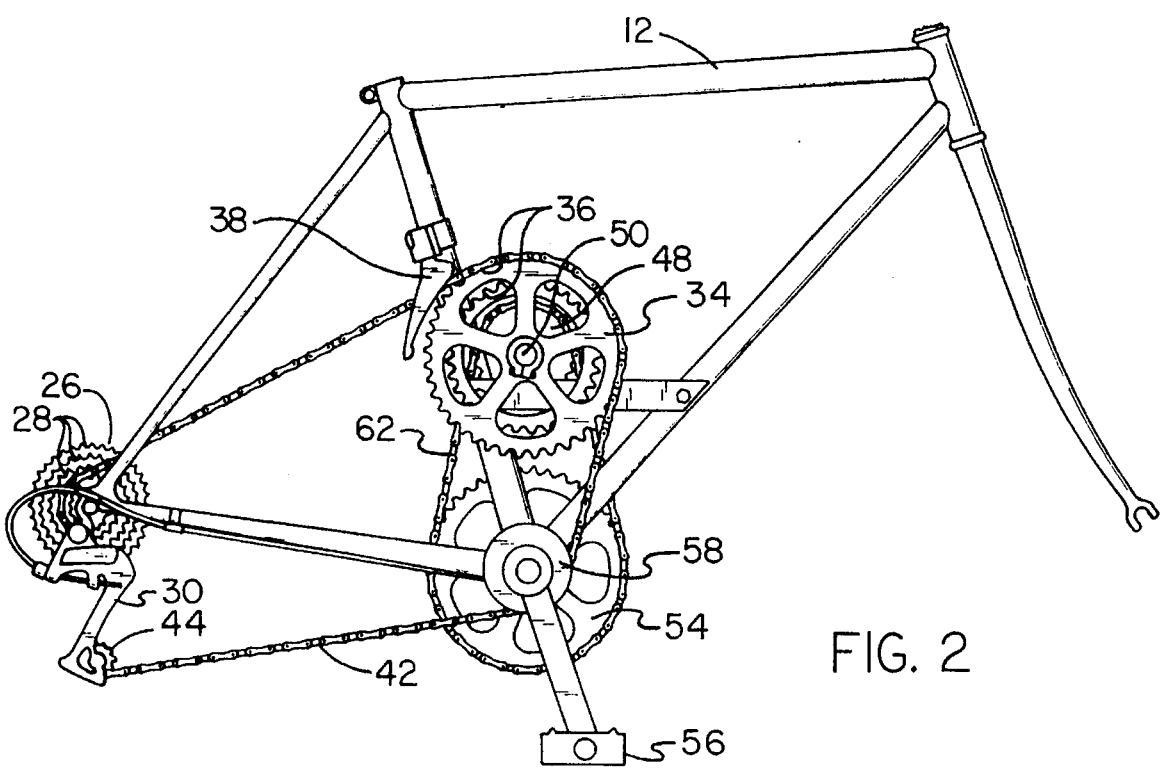
FIG. 2 is a side elevational view of the gear assembly employed in the bicycle of FIG. 1.
Figure 3:
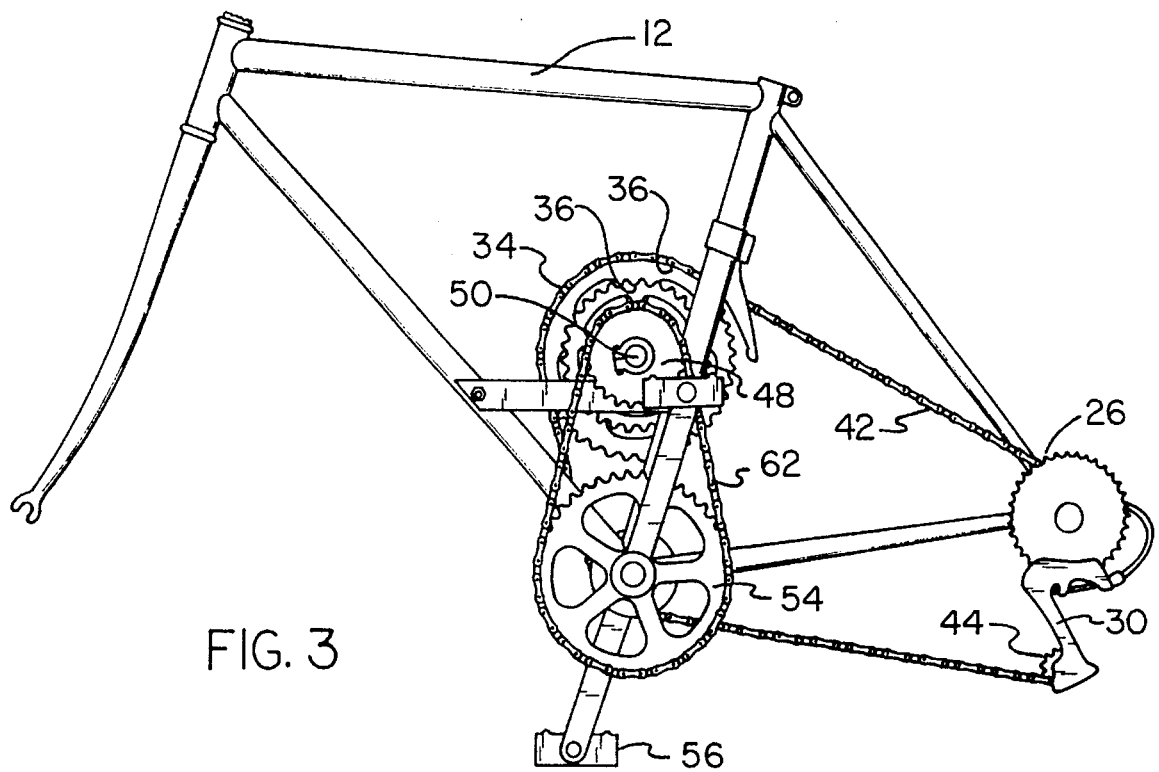
FIG. 3 is a side elevational view similar to FIG. 2 but taken from the opposite side thereof.
Figure 4:
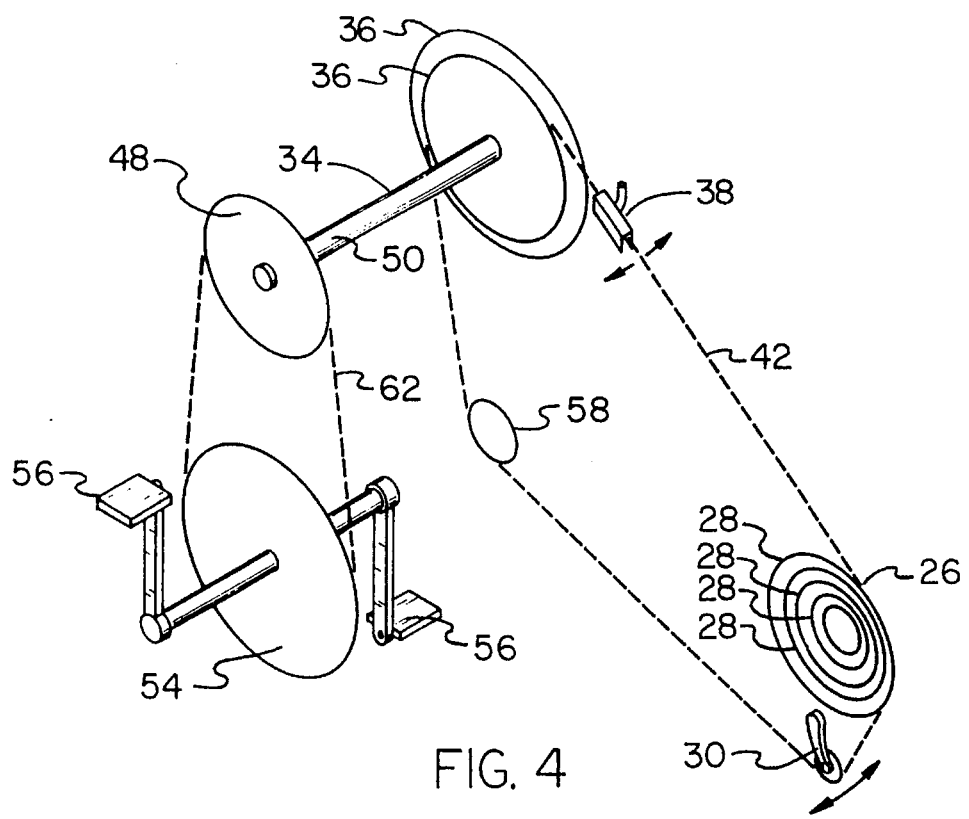
FIG. 4 is a schematic illustration of the gear assembly employed in the bicycle of FIGS. 1, 2 and 3.
Figure 5:
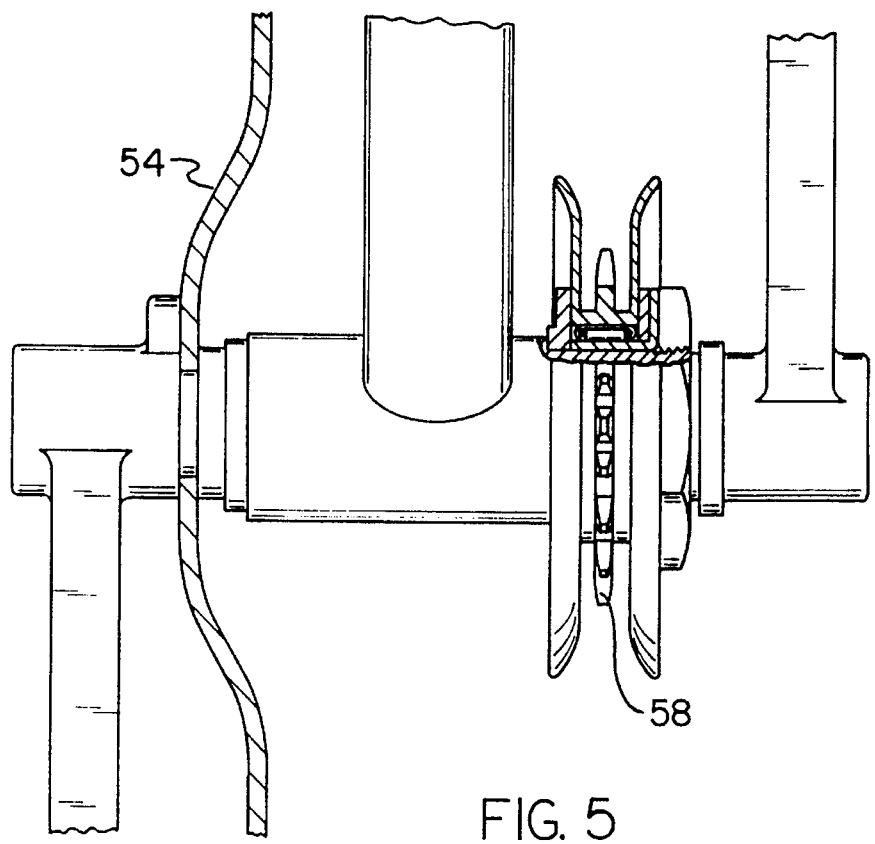
FIG. 5 is a front elevational view partly in section of one of the gears shown in the prior Figures.
Figure 6:
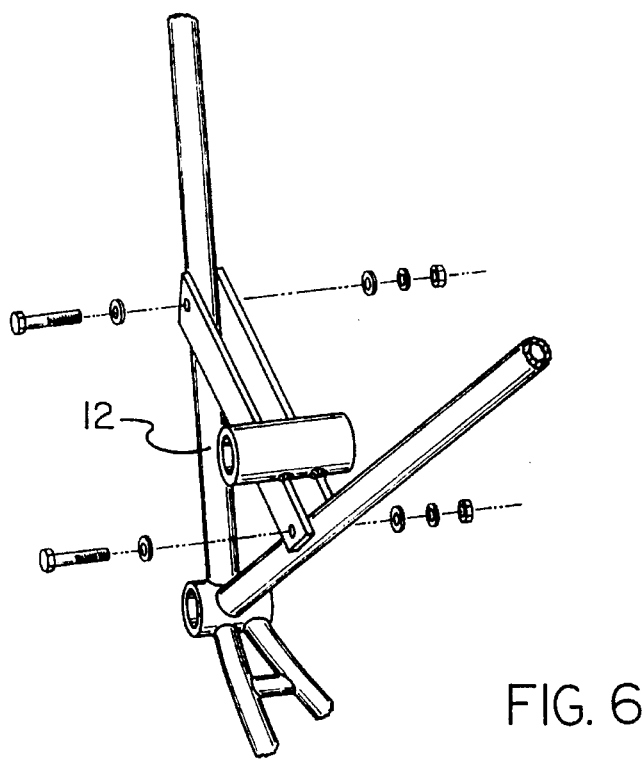
FIG. 6 is an enlarged perspective view of the a mounting arrangement for the device of the prior Figure.
Figure 7:
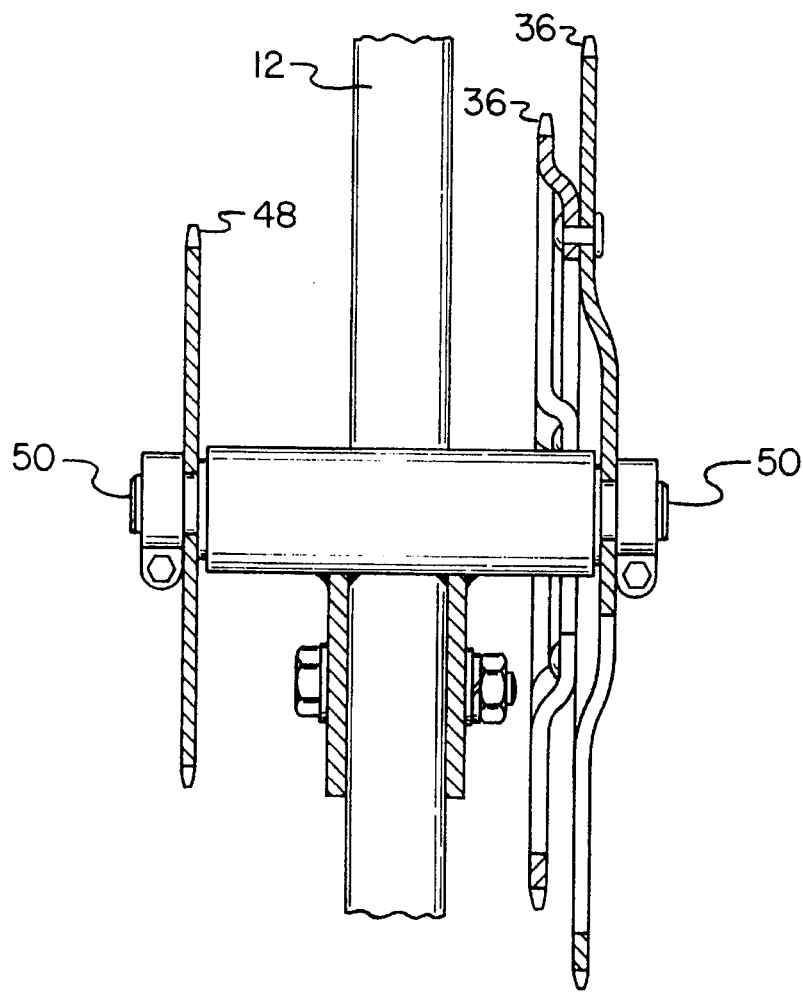
FIG. 7 is a front elevational view of the other gear assembly.
Figure 8:
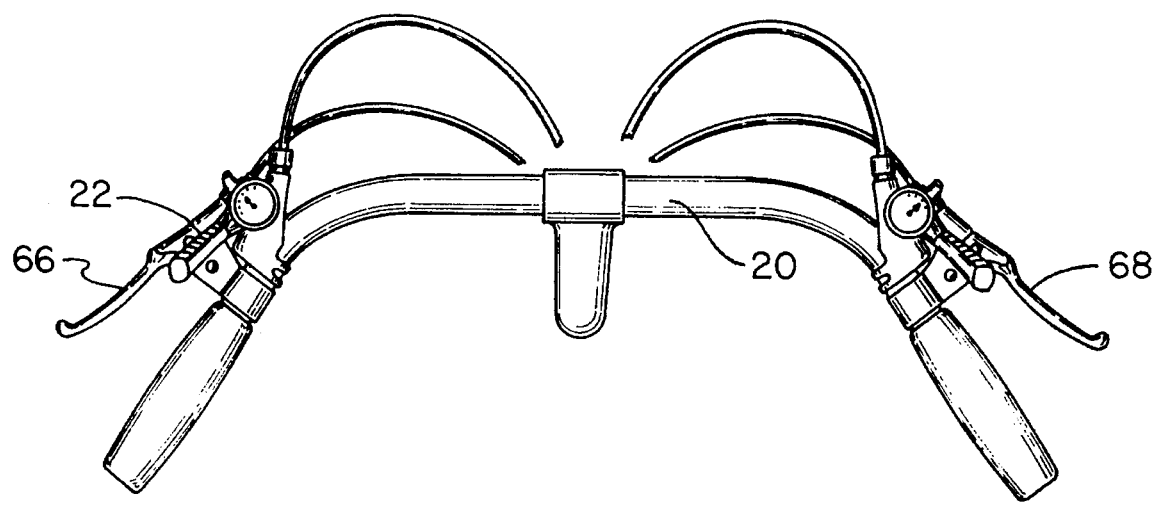
FIG. 8 is a top elevational view of the controls for the gear assembly of the prior Figure.

With reference now to the drawings, and in particular to FIG. 1 thereof, a new and improved twin gear drive assembly for a bicycle embodying the principles and concepts of the present invention and generally designated by the reference numeral 10 will be described.

The present invention, the new twin gear drive assembly for a bicycle is a system 10 comprised of a plurality of components, such components include, in their simplest terms, a bicycle, a front gear, a rear gear assembly, a front gear assembly, a first chain, an intermediate gear, a drive gear, a second chain, a first gear shifter and a second gear shifter.

The present invention is in a twin gear drive assembly in a bicycle 10. The bicycle is at first appearance conventional with a frame 12, front and rear wheels 14, 16, a seat 18, handle bars 20 and controls 22. The controls and drive assembly have a rear gear assembly 26. The rear gear assembly is formed of a plurality of concentrically mounted gears 28 coupled to each other for concurrent rotation. Such gear assembly is mounted on the frame for driving the rear wheel. In association therewith is a rear derailleur 30. Such derailleur is for shifting and retaining a chain on the proper gear as selected by the user. In the preferred embodiment, the front gear assembly features a free wheel sprocket with five gears having 14, 17, 20, 24 and 28 teeth in the primary embodiment.

In association therewith there is a front gear assembly 34. Such front gear assembly has a plurality of gears 36 on the frame for driving the front wheel. The gears are of varying diameters with varying numbers of teeth, preferably two gears, one with 40 teeth and the other with 48 teeth. The front gear assembly has an associated front derailleur 38. The front gear is for driving the rear gear.

A front chain 42 couples the front and rear gears. In association therewith, a chain retainer 44 is coupled therewith.

Next provided is an intermediate gear 48. Such gear is mounted on the frame. It has in association therewith a shaft 50 coupled to the front gear for concurrent rotation of the front gear, intermediate gear and shaft. Twenty-eight teeth are preferably formed on the intermediate gear.

The last gear is a drive gear 54. Such gear is also mounted on the frame. It is located preferably beneath the front gear assembly. It is provided with pedals 56 for rotation thereof by the user. A chain retainer 58 is also provided on opposite sides of the drive gear. The drive gear preferably has forty-eight teeth. Next provided is a second chain 62. Such second chain couples the drive gear and the intermediate gear. In this manner, rotation of the pedals will rotate the drive gear and, through the second chain, the intermediate gear. Rotation of the intermediate gear rotates the shaft and the front gear assembly. Rotation of the front gear assembly rotates the first chain and the rear gear assembly for applying motive power to the bicycle.

Movement of the derailleur to move the chain from one orientation to the other are effective through a pair of gear shifters. Such gear shifters include a first gear shifter 66 on the handle bars for controlling the front derailleur. A second gear shifter 68 also on the handle bars but on the opposite side thereof is for controlling the rear derailleurs.

The present invention is equipped with 2 chains. The twin gear, which consists of a second chain that can be assembled on a 10, 12 or 15 speed bicycle for luxury, which is compact, unique and has very close tolerance in order to make the twin gear function properly on the bicycle.

The twin gear intern gives the bicycle approximately 5 to 7 total miles per hour additional speed in comparability to the 10, 12 or 15 speed bicycles in order for the second chain on the left side of the upper shaft to coincide with the chain on the left side of the upper shaft to coincide with the chain on the upper shaft to coincide with the chain on the upper side of the bicycle, which is attached below the lower crankshaft located on a spindle enclosed by a chain retainer that holds the chain in place. The chain retainer helps in extending the chain to the five gears in the rear of the bicycle.

The second chain on the left side of the upper shaft extends downward to the lower crankshaft, which has been converted to the left side and is characterized as a 28 on a 40 and 48 twin gear.

The chain that is assembled on the lower right side of the shaft is characterized as a 40 twin gear, which can be transferred upward to a 48 twin gear. This gives the bicycle more thrust and a moderate increase in speed with less stress and strain on the legs in conjunction to pedaling and performing uphill. The increase in speed of approximately 5 to 7 miles per hour (compared to the 10, 12 and 15 speed bicycles) gives the present invention a new dimension in speed and performance.

The gear shift that is located and assembled on the handlebars of bicycles that is manufactured by several bicycle companies gives assistance in helping to change the gears from one to the other. The gear shift that is located on the right side of the handlebar, therefore, works in conjunction with the twin gear shall be moved slightly downward gradually in order to release the chain from the first larger gear on the rear, and that shall be a continuous process until the chain has been maneuvered to the smallest fifth gear on the rear for a 4 to 5 miles per hour increase in speed, adequacy and performance. The gear shift that is located and assembled on the left side of the handlebar gives assistance in helping the gears located on the upper right side of the shaft to change from the 40 twin gear to the 48 twin gear with a moderate increase in speed and performance.

The adjustment retainer that is located and assembled upward approximately 12 inches in the back center bar from the lower crankshaft gives assistance to the chain moving upward from the 40 twin gear to the 48 twin gear for a total increase in the twin gear speed of 5 to 7 miles per hour.

The total length of the twin gear from front to back is 10½ inches. The total width of the twin gear from left to right is 5¾ inches. The total weight of the present invention is 5¹/₁₀ lbs. The length of the chain that is assembled on the right side of the twin gear shaft is 63½ inches in diameter. The length of the chain that is assembled on the left side of therewith gear upper shaft extending downward to the lower crankshaft is 39 inches in diameter.

The twin gear is prepared to be mounted on the bicycle by drilling 2 holes: One hole is in the rear bar in the center space approximately 6½ inches upward on the center back bar from the lower center crankshaft. The other hole in the front center space bar approximately 9¼ inches upward on the front bar from the lower center crankshaft.

It can be mounted by using 2 nuts, 2 bolts and 2 lock washers. The twin gear is made up of 1 shaft, 2 cups, 11 bearings and 2 pins, located on the inside and outside around the shaft for proper cranking and ratio.

The brakes, which are also manufactured by several bicycle companies, are more than sufficient for stopping the present invention, which has been tested at its fastest speed. The present invention turns over in ratio only 1½ times from a set or standstill position, compared to 2 complete turns in regards to the 10, 12 and 15 speed bicycles from a set or standstill position.

The gear shift that is assembled and located on the right side of the handlebar shall be shifted gradually upward before coming to a complete stop in order for the chain that is located on the upper twin gear shaft that is extending to the five gears in the rear can be in the first gear position after coming to a complete stop before proceeding to your next take off.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved twin gear drive assembly for a bicycle comprising, in combination:

a bicycle having a frame, front and rear wheels, a seat, handle bars, and controls, a rear gear assembly including a plurality of gears on the frame adapted to drive the rear wheel with an associated rear derailleur for shifting and retaining the chain on a proper gear;

a front gear assembly with a plurality of gears adapted to drive the plurality of rear gears, the front gear assembly being coupled to the frame driving the rear wheel, the front gear assembly having an associated front derailleur;

a first chain coupling the front and rear gear assemblies, a first and second chain retainer coupled thereto, the first and second chain retainers each formed as a disc with a plurality of teeth;

an intermediate gear with a shaft coupled to the front gear assembly for concurrent rotation;

a drive gear coupled to the frame beneath the intermediate gear, the drive gear including pedals for the rotation thereof, the drive gear being coupled to and coaxial with the second chain retainer;

a second chain coupling the drive gear and the intermediate gear; and a first gear shifter on the handle bars for controlling the front derailleur.

* * * * *